March 22, 1949.  O. D. PREMO  2,464,890
PLANETARY DRIVE GEARING
Filed June 19, 1944  3 Sheets-Sheet 1

O. D. Premo
INVENTOR.

BY
ATTORNEYS.

March 22, 1949. O. D. PREMO 2,464,890
PLANETARY DRIVE GEARING
Filed June 19, 1944 3 Sheets-Sheet 2
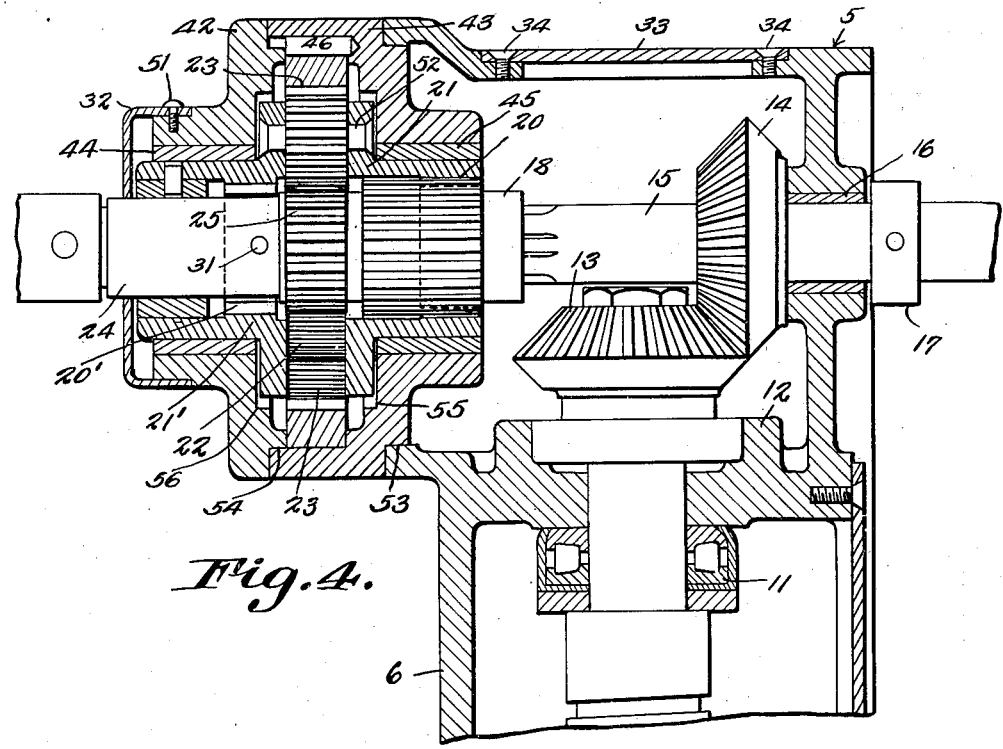
Fig. 4.
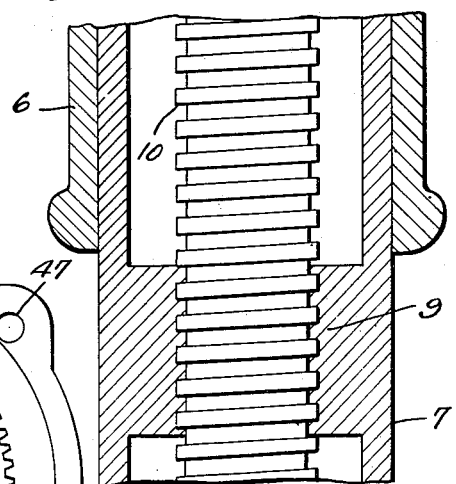
Fig. 5.
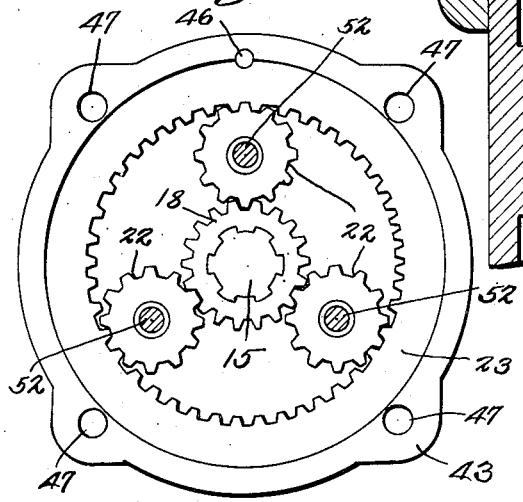
O. D. Premo
INVENTOR.
BY
ATTORNEYS.

March 22, 1949.  O. D. PREMO  2,464,890
PLANETARY DRIVE GEARING
Filed June 19, 1944  3 Sheets-Sheet 3

INVENTOR.
O. D. Premo
BY
ATTORNEYS.

Patented Mar. 22, 1949

2,464,890

UNITED STATES PATENT OFFICE 2,464,890

PLANETARY DRIVE GEARING

Owen D. Premo, Muskegon Heights, Mich.

Application June 19, 1944, Serial No. 541,040

1 Claim. (Cl. 74—750)

This invention relates to gearing, and more particularly to gearing of the planetary type.

The primary object of the invention is to provide planetary gearing, wherein the speed of a driven shaft may be either increased or decreased without the necessity of increasing or reducing the speed of rotation of the drive shaft.

Another object of the invention is to provide means for connecting the drive shaft and driven shaft of planetary gearing, to permit the shafts to rotate at varying speeds, with respect to each other, the connecting means being operated by sliding movement of the drive shaft.

A still further object of the invention is to provide planetary gearing which is easily assembled, self contained, and designed to be readily applicable for use on various types of machinery for either increasing or decreasing the speed.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Figure 4 is a sectional view through the planetary gearing illustrating the position of gears for decreasing the speed of the driven shaft.

Figure 5 is a sectional view through the planetary gearing and housing.

Figure 6:
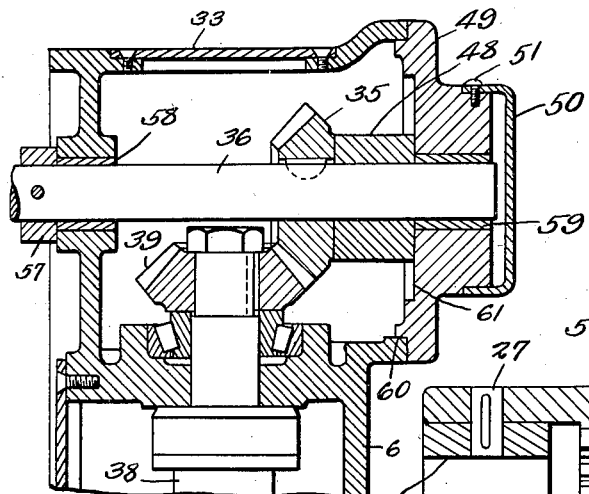

Figure 6 is a sectional view illustrating the gearing for operating the landing gear, which is controlled by the planetary gearing, and used when a pair of landing columns are used, and further illustrating the means provided for accommodating a planetary gear housing when an assembly change is desired for insertion of the planetary gear unit for the purpose of either changing the side from which to operate the crank and planetary gearing, or for obtaining so called dual controlled or individually operated planetary geared landing gear columns.

Figure 7:
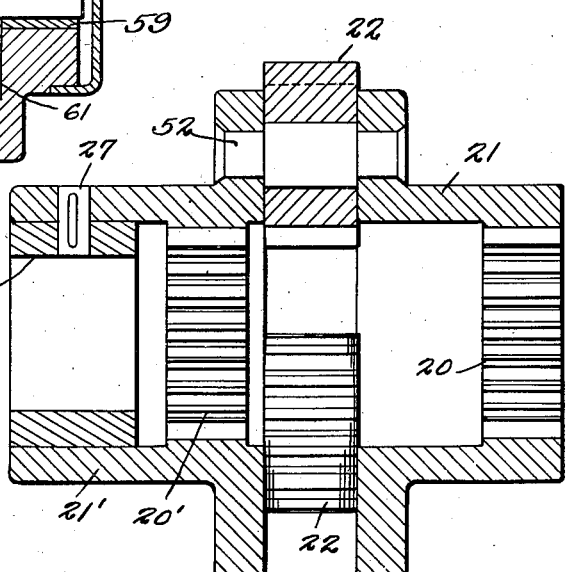

Figure 7 is a sectional view illustrating the internal teeth of the hubs of the planetary gearing, and the means of securing the pinions and hubs together and the collar, to form a complete sub-assembly which is very rigid, free from overhanging pinions, and simplified for the ease of assembly and cheapness of manufacture.

Figures 8, 9:
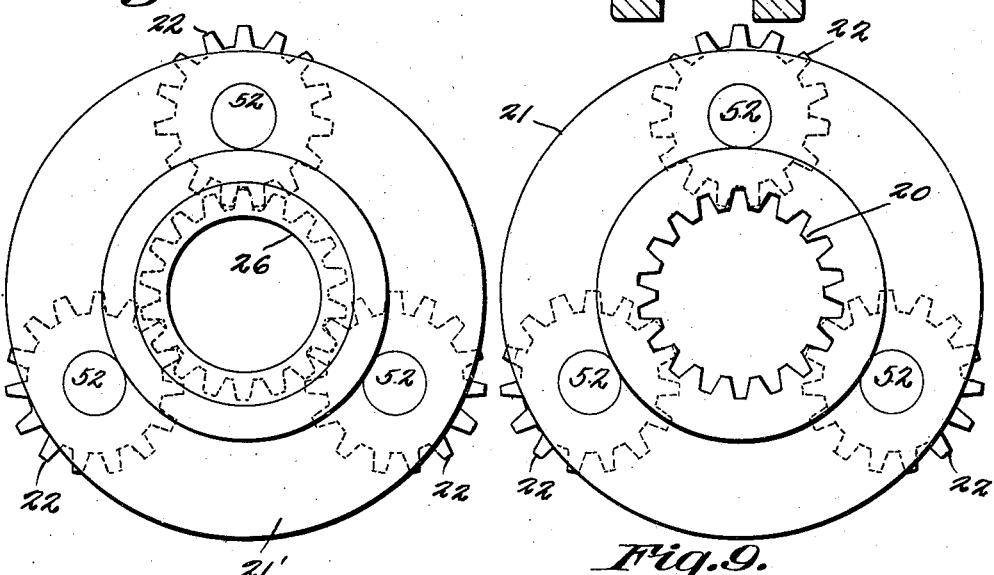

Figure 8 is an elevational view of the planetary gearing, as viewed from one end of the hub of the planetary gearing, illustrating the relative alignment of the teeth in the hub, and the circular form feature of the hub flange whereby tooth spaces in both hubs may be lined up perfectly and holes for the pinion shafts drilled through both hub flanges with regard only for the proper hole spacing and center distances of the pinions, and thus simplify and standardize manufacture.

Figure 9 is an elevational view of the planetary gearing when viewed from the opposite end of the hub and pinion sub-assembly, illustrating the relative alignment of the teeth in the hub of the sub-assembly and the accessibility of the internal teeth of the hub, and the conforming sizes of the hub flanges and hole locations.

Referring to the drawings in detail, the planetary gearing in the present showing is used in raising and lowering the wheels of landing gears for trucks, the reference character 5 indicating the landing gear housing, which is formed with a lower tubular section 6 in which the post 7, to which the wheels 8 of the landing gear are connected, moves. The post 7 is provided with a threaded portion 9 that accommodates the threaded screw 10, so that rotary movement of the threaded screw 10 will operate to move the post 7 vertically, within the tubular section 6.

The upper end of the threaded screw 10 is mounted in bearings 11, and extends through the partition 12 of the landing gear housing 5, the extremity of the threaded screw supporting the beveled pinion 13, that meshes with the beveled pinion 14 secured to the driven shaft 15.

The shaft 15 is mounted in the bearing 16 and is restricted against longitudinal movement, by the collar 17 mounted on the shaft 15.

The inner end of the shaft 15 is splined with respect to the tubular gear 18, into which the shaft 15 extends, the tubular gear 18 having elongated teeth 19 that are adapted to mesh with the internal teeth 20 of the planetary gear hub 21. This tubular gear is constructed so that it may slide within the gear hub 21 and mesh with the planetary gears 22 that are carried by the planetary gear hubs 21 and 21', as clearly shown by Figure 2 of the drawings.

A ring gear 23 is mounted within the planetary gear housing 43, and is keyed from movement by pin 46, and is so located that the planetary gears 22 mesh therewith.

The drive shaft is indicated by the reference character 24 and is constructed to slide longitudinally of the planetary gear housing. The drive shaft 24 is formed with teeth 25 that mesh with internal teeth formed within the planetary gear hub 21'. Secured within one end of the planetary gear hub 21', is a bearing 26, which is held to the gear hub 21', by means of the pin 27. This bearing 26 is adapted to engage the annular shoulder 28 of the drive shaft 24, and limit the outward movement of the drive shaft, and properly position the sliding gears 25 and 18.

Fitted in one end of the drive shaft, is a headed coupling pin 29 which is of a diameter to fit within the counterbored end of the tubular gear 18. The tubular gear 18 is formed with an annular groove into which the split ring 30 is adapted to expand, the split ring 30 providing means for coupling the drive shaft 24 and the tubular gear 18, for longitudinal movement within the planetary gear hubs, and at the same time permit of rotary movement of the drive shaft 24 with respect to the driven shaft 15 in accomplishing the speed changes of the planetary gearing.

A pin indicated by the reference character 31, secures the coupling pin 29 to the drive shaft 24 so that the coupling pin 29 will rotate with the drive shaft 24.

A dust cap indicated by the reference character 32 is fitted over one end of the planetary gear housing cover 42 and secured by members 51, and has close engagement with the drive shaft 24, to exclude the elements.

In order that access may be had to the landing gear housing, a removable cover plate 33 is provided, which is held in position by means of the screws 34.

A planetary gear housing indicated by the reference character 43 is mounted on the landing gear housing 5 by a machined fit shown at 53, which machined fit is the same diameter as machined fit 54. Bolt holes 47 located in the planetary gear housing 43 and the planetary gear housing cover 42 permit cap screws to pass therethrough and be fastened into correspondingly located tapped holes in the langing gear housing 5, securing the members together. Due to this construction, it will be obvious that by removing the bolts positioned within bolt holes 47, the planetary gearing may be readily removed and a direct drive permitted without the cost or advantage of the planetary gearing which may be added at a future date. A machined bearing recess 55 receives the flange of the planetary gear hub 21 and limits longitudinal movement in that direction, a similar recess 56 receiving the flange of the planetary gear hub 21' and limits longitudinal movement in that direction, bearing 45 is secured to the planetary gear housing by a press fit, and provides a journal for the gear hub 21. Similar bearing 44 is secured to the planetary gear housing cover and journals the gear hub 21'.

Shafts 52 are provided with a larger diameter in the center providing shoulders that bear against the gear hubs 21 and 21', the larger diameters supporting the planetary gears 22 with a free running fit both on the diameter and longitudinally, both ends of the shafts of smaller diameters being supported in the gear hubs 21 and 21', the small ends being riveted or peened over at assembly to further secure this as a sub-assembly and to eliminate any independent longitudinal movement of the hubs 21 and 21'.

The landing gear housing farthest from the planetary gearing supports the shaft 36 to which the drive gear 35 is keyed. The collar 57 which is pinned to shaft 36, limits the longitudinal movement of the shaft in one direction. Upper cross shaft tube 37 is pinned to shaft 36 at one end and is connected to shaft 15 at the other end, collars 57 and 17 bear against the opposed landing gear housing 5 limiting longitudinal movement of splined shaft 15 and shaft 36. Spacer 48 maintains gear 35 in position and permits gear 35 to be a duplicate of gear 14 for production purposes. Landing gear housing cover 49 is the same as member 42 except for the diameter of the bore, holes 47 are also provided in cover 49. Cap screws pass through these holes and are threaded into similar located tapped holes in the landing gear housing 5. Bearing 59 journals shaft 36. Dust cap 50 is secured to member 49 by the member 51 sealing the internal mechanism against the elements. Machined fit indicated by character 61 is the same as machined fits 55 and 56, and machined fit 60 is the same as machined fits 53 and 54 so that manufacturing may be accomplished with the minimum of tooling and the maximum production. Bearing 58 journals shaft 36 at one end. Gear 35 drives gear 39 keyed to the upper end of screw 38 to operate the landing gear post 7 raising or lowering landing gear wheels 8. Cross tube 40 connects the two landing gear housings for rigidity. The crank member 41 is a manually operated member of sufficient length from 12" to 24" to give the desired torque for operation.

In the present application of the invention, the planetary gearing is shown as used in connection with landing gear of trucks, wherein landing gear housing 5 and vertically movable posts 7 are provided, the landing gear housing at one side of the landing gear, housing the planetary gear structure, while the landing gear housing at the opposite side of the landing gear, houses the pinion 35 which is secured to the shaft 36, that in turn is connected with the driven shaft 15, by the tubular shaft 37. The post 7 at this side of the landing gear, is identical with the post 7 at the opposite side thereof, and this post is moved vertically by means of the screw 38 that moves over threads of the post. The screw 38 is provided with a pinion 39 that meshes with the pinion 35. Thus it will be seen that due to this construction, rotary movements of the drive shaft 24 and the driven shaft 15 at one side of the landing gear, may be transmitted to the post at the opposite side of the landing gear, moving the posts 7 and wheels 8 supported thereon vertically, simultaneously.

The landing gear housings 5 are held in proper spaced relation with respect to each other, by means of the cross bar 40, which is shown as connected with the housings 5.

In the operation of the landing gear, it will be obvious that the crank handle 41 provides means whereby rotary movement may be imparted to the drive shaft 24.

Assuming that the trailer to be lifted by the landing gear is loaded, and is exceptionally heavy, it is necessarily advantageous to increase the power of the drive shaft. This is done by pushing inwardly on the crank shaft to force the drive shaft 24 inwardly to the position shown by Figure 4, whereupon the tubular gear 18 is moved from the position shown by Figure 2 of the drawings, to the position shown by Figure 4 of the drawings, wherein the teeth 25 of the drive shaft 24 mesh with the planetary pinions 22, and teeth 19 of the tubular gear 18 mesh with the teeth 20 of the gear hub 21, to give the greatest gear reduction which means more turns of the crank with a corresponding increase in lifting ability.

Figure 1:
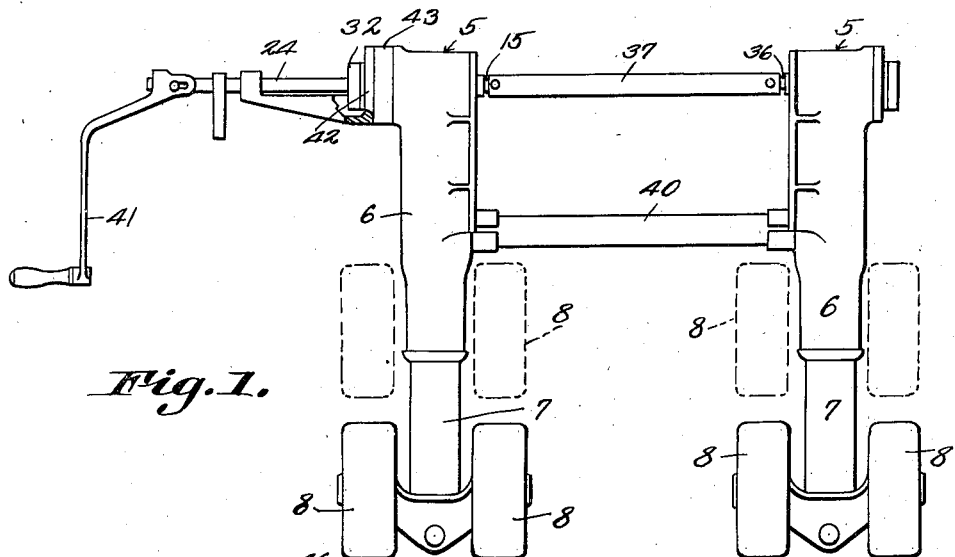
Figure 1 is an elevational view illustrating planetary gearing forming the essence of the invention, as applied for operating landing gear of trucks.
Figure 2:
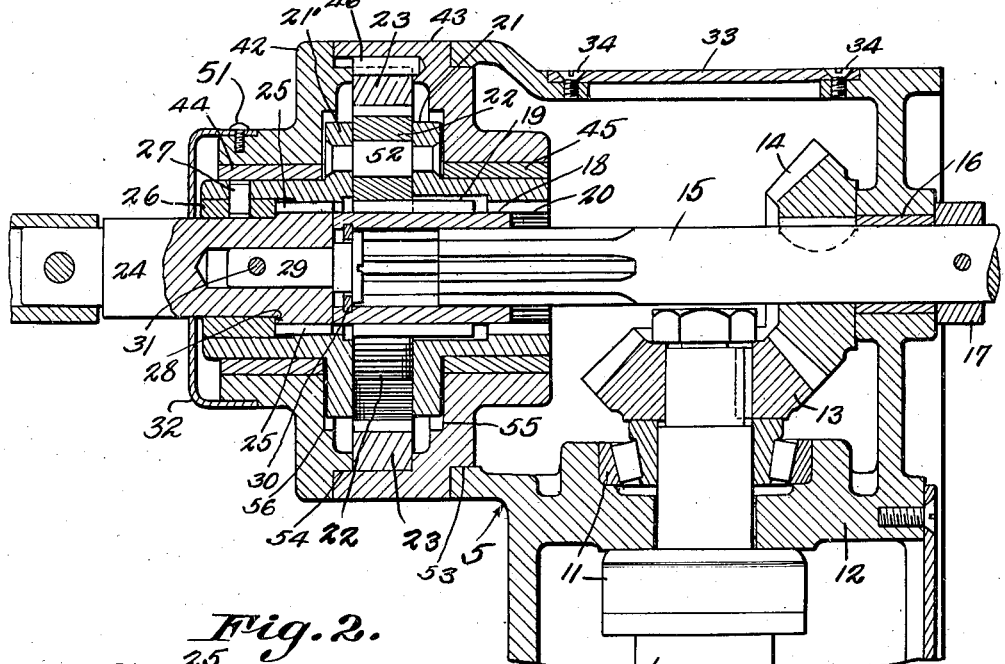
Figure 2 is a sectional view through the planetary gearing illustrating the position of gears for increasing the speed of the driven shaft.
Figure 3:
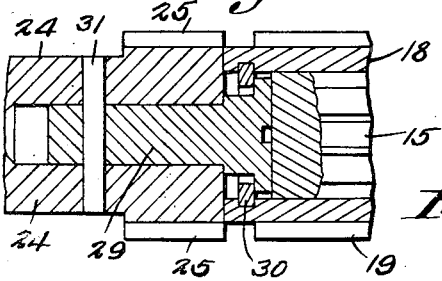
Figure 3 is an enlarged sectional view illustrating coupling means for connecting the drive shaft to the driven shaft for accomplishing the transfer of speed changes from one shaft to the other.

Assuming that the landing gear wheels are to be lowered to the ground line, or that they are to be raised into the traveling position, it is necessarily advantageous to speed up the operation of moving the unloaded landing gears into position, and this is accomplished by pulling outward on the crank or drive shaft 24 to bring it to a stop against member 26 further indicated by the annular shoulder character 28, thereby bringing teeth 25 of the drive shaft 24 to mesh with teeth 20' of the internal gear hub 21', the coupling pin 29 pulls the tubular sliding gear 18 along longitudinally so that teeth 19 of the tubular gear 18 mesh with the planetary gears 22, teeth 19 of the tubular gear 18 becoming disengaged from teeth 20 of the internal gear hub 21, as shown by Figure 2 of the drawings. Thus it will be seen that turning the crank 41 causes rotation of drive shaft 24, teeth 25 of the drive shaft 24 engaging teeth 20' of the internal gear hub 21' to cause the hub 21' to rotate, forcing gears 22 to travel on the internal ring gear 23 at the outer extremity and tubular gear 18 on the inner extremity, this forced rotation of planetary pinions 22 causes tubular gear 18 to rotate faster than the drive shaft 24, the coupling pin 29 permits this, teeth 20 of the internal gear hub 21 being disengaged for the fast operation necessarily run idle although the internal gear hub 21 does serve to give perfect balancing to the rotating planetary gearing and equalize the thrust offered by planetary gears 22. Tubular gear 18 with internal splines 20 engage the splined end of shaft 15, imparting the rotary movement to shaft 15 causing bevel gears 14 and 35 to rotate bevel gears 13 and 39 respectively and the screws 10, which moves columns 7 to position wheels 8.

The decided advantage for the use of this planetary gearing for landing gears, screw type automobile jacks, airplane dolly jacks, and similar mechanism lies in the advantage of the extremely large ratio in a comparatively small space, the high gear for positioning, and the low gear for lifting ability. Also the design is such that comparatively great torques can be transmitted through the planetary gearing.

It will of course be understood that although the structure is shown as for use in connection with landing gears, the gearing and mechanism may be effectively employed as a means for operating jacks, or similar elevating mechanism, also the planetary gear mechanism may be employed as a speed reducing and a speed increasing means for various machinery applications, such as for, a motor speed change, various types of hoisting mechanism including the lift type of hoists, machinery change gear box, et cetera, without departing from the spirit of the invention.

It will further be seen that the handle 41 may be supplemented by suitable gearing and power mechanism not shown, for rotating the drive shaft, should it be desired to do so.

What is claimed is:

In a device of the character described, a planetary gear housing, a planetary gear housing cover, means for mounting the planetary gear housing and planetary gear housing cover, bearings mounted within the planetary gear housing and the planetary gear housing cover, a stationary internal ring gear mounted within the planetary gear housing, planetary gears mounted between two planetary gear hubs, shafts supporting said planetary gears, planetary gear hubs with internal gear teeth in spaced relation, a bearing mounted within one of the gear hubs, pin means securing the bearing in place, a drive shaft extending into the planetary gear housing, with a gear adapted to engage the planetary gear hub or the planetary gears, a tubular gear adapted to engage the other planetary gear hub or the planetary gears, both the drive shaft gear and the tubular gear being slidably mounted within the planetary gear housing and cover, coupling means for securing the drive shaft gear and the tubular gear for longitudinal movement within the planetary gear housing and for permitting different speeds of rotation between the drive shaft gear and the tubular gear, a driven shaft extending into the planetary gear housing, a splined end of the driven shaft engaging the internally splined tubular gear slidably mounted thereon and dust shield means to protect the mechanism from the elements.

OWEN D. PREMO.

REFERENCES CITED

The following references are of record in the file of this patent:

UNITED STATES PATENTS

| Number | Name | Date |
| --- | --- | --- |
| 1,342,191 | Walker | June 1, 1920 |
| 1,777,997 | Wise | Oct. 7, 1930 |
| 2,232,187 | Reid | Feb. 18, 1941 |